(12) United States Patent
Tsumiyama et al.

(10) Patent No.: US 10,500,992 B2
(45) Date of Patent: Dec. 10, 2019

(54) BENCH SEAT FOR A UTILITY VEHICLE (71) Applicant: KAWASAKI JUKOGYO KABUSHIKI KAISHA, Hyogo (JP)

(72) Inventors: Yoshinori Tsumiyama, Miki (JP); Teruaki Yamamoto, Himeji (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 258 days.

(21) Appl. No.: 15/393,421

(22) Filed: Dec. 29, 2016

(65) Prior Publication Data
US 2018/0186256 A1 Jul. 5, 2018

(51) Int. Cl.
*B60N 2/30* (2006.01)
*B62D 23/00* (2006.01)
*B60R 22/26* (2006.01)
*B60K 15/063* (2006.01)
*B60R 7/04* (2006.01)
*F02M 35/04* (2006.01)

(52) U.S. Cl.
CPC .............. *B60N 2/305* (2013.01); *B60K 15/063* (2013.01); *B60R 22/26* (2013.01); *B62D 23/005* (2013.01); *B60K 2015/0632* (2013.01); *B60R 7/043* (2013.01); *F02M 35/048* (2013.01)

(58) Field of Classification Search
CPC ...... B60N 2/305; B60N 2/3045; B60R 7/043; B60R 22/26; B60R 2022/266; B60R 2011/0012
USPC ........................................................ 297/188.1
See application file for complete search history.

(56) References Cited

U.S. PATENT DOCUMENTS

| | | | | |
|---|---|---|---|---|
| 5,775,780 A * | 7/1998 | Murphy | ............... | B60N 2/0825 297/216.18 |
| 5,816,650 A * | 10/1998 | Lucas, Jr. | ............ | B60N 2/3045 297/188.1 |
| 6,139,096 A * | 10/2000 | Anderson | .............. | B60N 3/002 297/188.1 |
| 6,488,327 B1 * | 12/2002 | Pearse | ................... | B60N 2/2863 296/37.15 |
| 6,877,807 B2 * | 4/2005 | Mizuno | ................... | B60N 2/305 297/188.08 |
| 7,063,389 B2 * | 6/2006 | Kennedy, Sr. | .......... | B60N 2/688 297/475 |
| 7,523,985 B2 * | 4/2009 | Bhatia | .................... | B60N 2/206 297/188.04 |

(Continued)

*Primary Examiner* — David R Dunn
*Assistant Examiner* — Tania Abraham
(74) *Attorney, Agent, or Firm* — Wenderoth, Lind & Ponack, L.L.P.

(57) ABSTRACT

A bench seat for a utility vehicle includes a seat cushion configured to be movable between an open position where a rear portion is lifted by way of a hinge portion mounted on a front end so that the occupant is allowed to access a space disposed below the seat cushion and a normal position where the rear portion is not lifted; a plurality of seatbelt buckles disposed behind the seat cushion, the plurality of seatbelt buckles being provided corresponding to the plurality of occupants, at least two seatbelt buckles among the plurality of seatbelt buckles being disposed close to each other in the lateral direction; and a seat fixing device disposed between said two seatbelt buckles disposed close to each other, the seat fixing device being configured to lock the seat cushion positioned at the normal position to a chassis.

4 Claims, 6 Drawing Sheets

(56) References Cited

U.S. PATENT DOCUMENTS

| | | | | |
|---|---|---|---|---|
| 7,735,896 | B2* | 6/2010 | Kubota | B60N 2/3013 296/37.14 |
| 7,857,350 | B2* | 12/2010 | Yamada | B60N 2/0705 280/801.1 |
| 8,091,957 | B2* | 1/2012 | Allmann | B60R 7/043 297/129 |
| 2004/0130175 | A1* | 7/2004 | Mack | B60N 2/3015 296/65.09 |
| 2007/0200412 | A1* | 8/2007 | Abraham | B60N 2/3013 297/394 |
| 2008/0197683 | A1* | 8/2008 | Ebbeskotte | B60N 2/3013 297/330 |
| 2009/0094807 | A1* | 4/2009 | Sugimoto | B60R 22/03 24/589.1 |
| 2014/0225403 | A1* | 8/2014 | Shimada | B60R 7/043 297/188.1 |
| 2014/0261275 | A1 | 9/2014 | Takahashi et al. | |
| 2016/0039387 | A1* | 2/2016 | Taubert | B64D 11/06 297/117 |

\* cited by examiner

BENCH SEAT FOR A UTILITY VEHICLE

BACKGROUND OF THE INVENTION

Technical Field

The present invention relates to a bench seat for a utility vehicle.

Related Art

As a bench seat for a utility vehicle, there has been known a bench seat for a utility vehicle which has an engine room in which an engine is disposed, an accessory storing space in which accessories such as an air cleaner box, a fuel tank, a battery are disposed, and a storage space for storing luggage, below the bench seat for a utility vehicle (see US2014/0261275A1, for example).

The bench seat includes a seat cushion on which an occupant is seated. The seat cushion is supported from below by a seat frame. In general, in the utility vehicle, the seat cushion is mounted on a seat frame by fitting. With such mounting of the seat cushion by fitting, the seat cushion can be easily removed, and the occupant can easily access the spaces positioned below the seat cushion.

SUMMARY

When excessively large vibrations are applied to the utility vehicle when the utility vehicle is traveling on rough road, for example, there may be a case where the seat cushion flatters on the seat frame. To suppress such flattering of the seat cushion, it is necessary to strongly fix the seat cushion to the seat frame. However, when the seat cushion is fixed to the seat frame by fastening, mounting and removal of the seat cushion becomes cumbersome. To firmly fix the seat cushion to the seat frame while maintaining easiness in mounting and removal of the seat cushion, it may be possible to lock the seat cushion to the seat frame using a seat fixing device having a locking releasing operating part.

In this case, however, when the operating part of the seat fixing device is disposed below the seat cushion, access to the operating part is impaired. On the other hand, when the operating part is disposed above the seat cushion, an area where an occupant can be seated is decreased.

The present invention has been made in view of the above-mentioned drawbacks, and it is an object of the present invention to provide a bench seat for a utility vehicle where a seat cushion is fixed by way of a seat fixing device so as to configured to be opened and closed, wherein an area where an occupant is seated can be ensured while allowing the occupant to easily access the seat fixing device.

A bench seat for a utility vehicle is configured to be sit side by side in a lateral direction by a plurality of occupants. The bench seat includes a seat cushion configured to be movable between an open position where a rear portion is lifted by way of a hinge portion mounted on a front end so that the occupant is allowed to access a space disposed below the seat cushion and a normal position where the rear portion is not lifted; a plurality of seatbelt buckles disposed behind the seat cushion, the plurality of seatbelt buckles being provided corresponding to the plurality of occupants, at least two seatbelt buckles among the plurality of seatbelt buckles being disposed close to each other in the lateral direction; and a seat fixing device disposed between said two seatbelt buckles disposed close to each other, the seat fixing device being configured to lock the seat cushion positioned at the normal position to a chassis.

According to the present invention, the seat fixing device can be disposed in a compact manner by effectively making use of a dead space formed between the seatbelt buckles disposed adjacently to each other. With such a configuration, it is possible to ensure an area where the occupants can be seated while allowing the occupant to easily access the seat fixing device.

The bench seat for a utility vehicle can preferably adopt the following configurations.

(1) The rear portion of the seat cushion has a recessed portion indented toward a front side as viewed in a plan view, and an operating part of the seat fixing device is disposed in the inside of the recessed portion.

With the above-mentioned configuration (1), the operating part of the seat fixing device can be easily visually recognized from above and hence, operability of the seat fixing device is enhanced. The operating part can be easily disposed closer to a front side of the seat cushion while being disposed behind the seat cushion and hence, accessibility to the operating part from a front side can be enhanced. Further, by disposing the operating part in the inside of the recessed portion, the occupant can easily find the place where the operating part is disposed, also by touch without relying on viewing with eyes and hence, accessibility to the operating part is enhanced.

(2) The bench seat for a utility vehicle has the configuration (1), and the seat cushion has a raised portion raised upward on a peripheral portion of the recessed portion.

With the above-mentioned configuration (2), the occupant can easily insert his hand into the space below the raised portion and hence, the occupant can easily grip the seat cushion whereby the occupant can easily move the seat cushion between the open position and the normal position.

(3) The bench seat for a utility vehicle has the configuration (2), and a body of the seat fixing device is positioned below the raised portion.

With the above-mentioned configuration (3), the seat fixing device can be disposed below the raised portion in an overlapping manner and hence, seat fixing device can be disposed in a compact manner. Further, by disposing the seat fixing device below the raised portion, the seat fixing device can be easily disposed close to an upper surface of the seat cushion and hence, operability of the seat fixing device can be enhanced. Further, due to the formation of the raised portion, the occupant can easily find the place where the operating part is disposed, also by touch without relying on viewing with eyes and hence, accessibility is enhanced.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

A utility vehicle according to one embodiment of the present invention is described with reference to attached drawings. For the sake of convenience of description, the description is made by setting an advancing direction of the utility vehicle as "front side" of the utility vehicle and respective parts, and by setting left and right sides in a vehicle width direction as viewed from an occupant as "left and right sides" of the utility vehicle and the respective parts.

Figure 1:
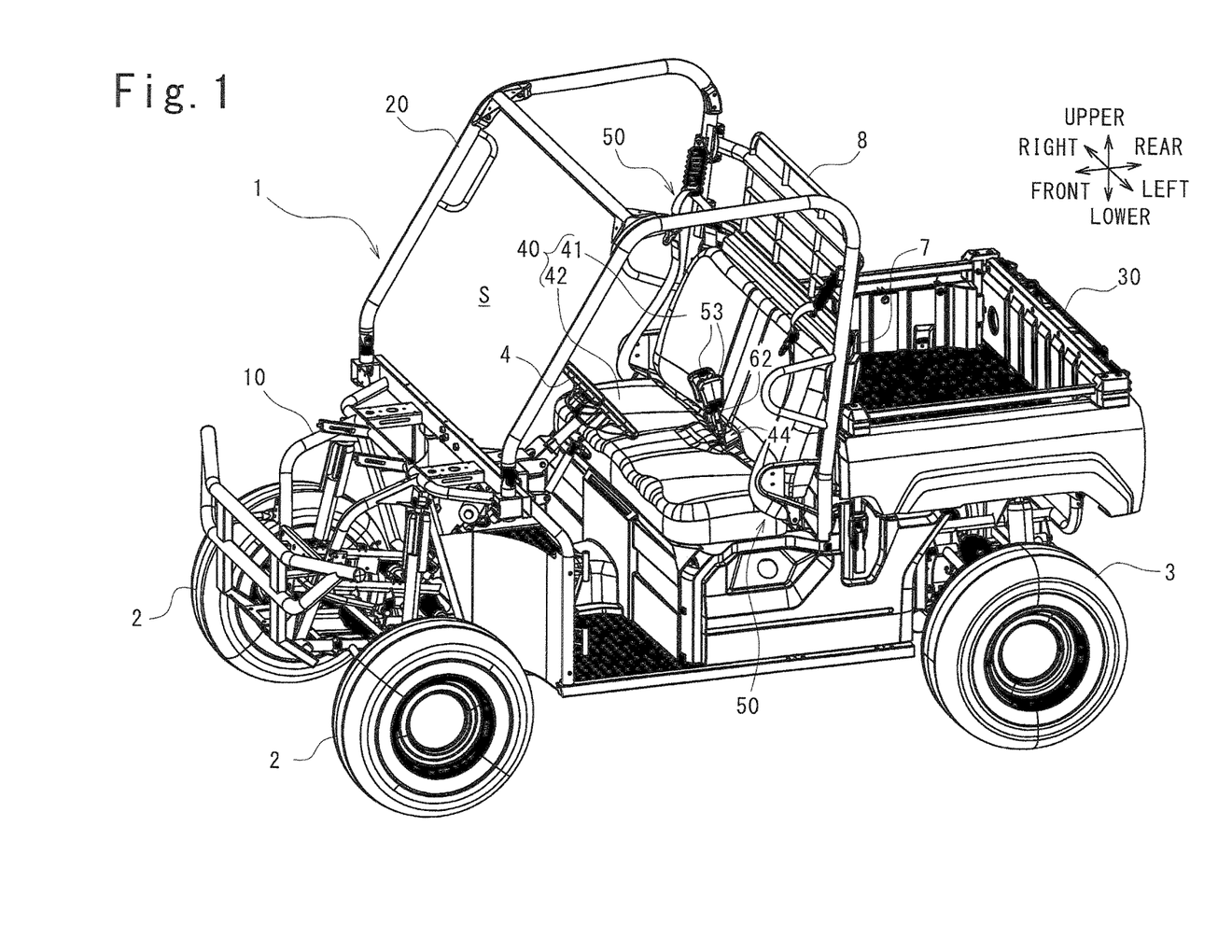
FIG. 1 is a perspective view of a utility vehicle according to one embodiment of the present invention as viewed from a left front side.

FIG. 1 is a perspective view of a utility vehicle 1 according to one embodiment of the present invention as viewed from a left front side. In the drawing, exterior constitutional members (a hood, a door, a fender and the like), a dash panel and the like disposed on a front portion of the vehicle are omitted. As shown in FIG. 1, the utility vehicle 1 includes: a chassis 10 which forms a frame portion; a pair of left and right front wheels 2 and a pair of left and right rear wheels 3 which are disposed on a front end and a rear end of the chassis 10, respectively; a riding space S which is surrounded by ROPS 20 between the front wheel 2 and the rear wheel 3; and a cargo bed 30 which is disposed behind the riding space S and above the chassis 10.

In the riding space S, a bench-like seat 40 is mounted on the chassis 10, and a handle 4 is disposed in front of the seat 40. A rear cover 7 which covers the seat 40 from behind is mounted on a rear portion of the ROPS 20. A grid-like screen 8 is mounted on an upper side of the rear cover 7. The above-mentioned ROPS is an abbreviation of rollover protective structure.

Figure 3:
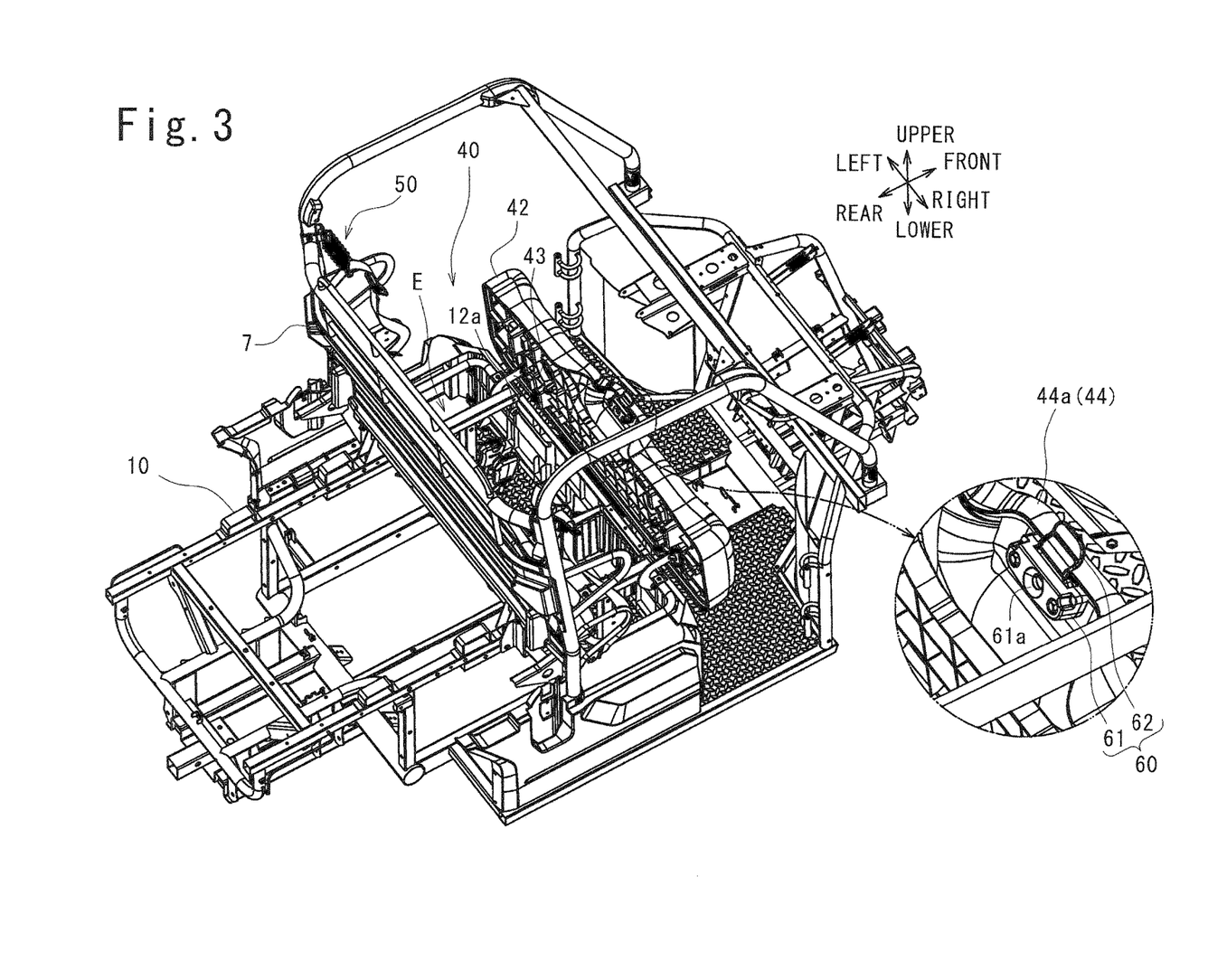
FIG. 3 is a perspective view of the chassis as viewed from a rear upper side.

The seat 40 includes: a seat back 41 which forms a backrest; a seat cushion 42 which supports occupants from below; seatbelt devices 50; and a seat fixing device 60 which is configured to lock the seat cushion 42 to the chassis (FIG. 3).

Although not shown in the drawing, below the seat cushion 42, a seat lower space E is formed. The seat lower space E includes an engine room in which an engine is installed, an accessory storing space in which accessories such as an air cleaner box, a fuel tank and a battery are disposed; and a storage space for storing a luggage or the like (FIG. 3). As described later, by moving the seat cushion 42 toward an open position after releasing the engagement by the seat fixing device 60, the occupant can access the seat lower space E from the riding space S.

Figure 2:
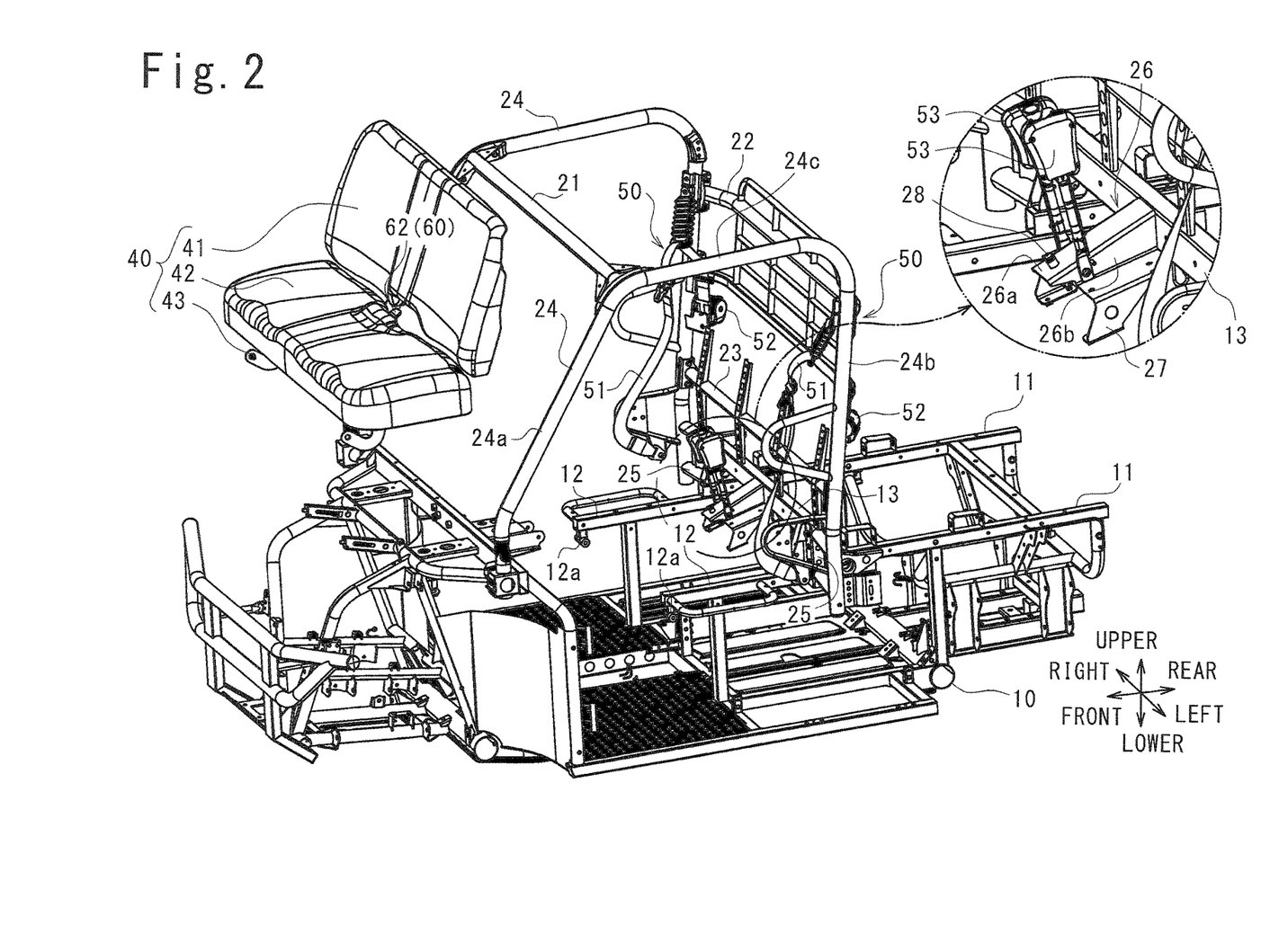
FIG. 2 is a perspective view showing a state where a bench seat is disassembled from a chassis shown in FIG. 1.

FIG. 2 is a perspective view of the chassis 10 and the ROPS 20. FIG. 2 also shows the seat 40 removed from the chassis 10. As shown in FIG. 2, the seatbelt device 50 is provided for each occupant, and the seatbelt device 50 is provided to a driver's seat and a passenger's seat respectively in this embodiment. Each seatbelt device 50 is a so-called three-point-type seatbelt, and includes: a seatbelt 51 whose one end portion is locked; a seatbelt retractor 52 which is mounted on the other end portion of the seatbelt 51; and a seatbelt buckle 53 which locks a middle portion of the seatbelt 51 rapped around an occupant by way of a fitting.

The seatbelt retractor 52 is disposed on an outer side in the vehicle width direction, and the seatbelt buckle 53 is disposed on an inner side in the vehicle width direction. In other words, both the seatbelt buckle 53 for a driver's seat and the seatbelt buckle 53 for a passenger's seat are disposed close to each other on the inner side in the vehicle width direction, to be more specific, at a center portion in the vehicle width direction.

The ROPS 20 is formed of: a pair of left and right side units 24 made of a metal pipe; and first to third cross members 21 to 23 made of a metal pipe and connecting both side units 24 to each other.

Each side unit 24 is an integral body formed of: a front pole portion 24a extending vertically in a front portion of the side unit 24; a rear pole portion 24b extending vertically in a rear portion of the side unit 24; and an upper beam portion 24c extending longitudinally and connecting an upper end portion of the front pole portion 24a and an upper end portion of the rear pole portion 24b. The front pole portion 24a, the rear pole portion 24b and the upper beam portion 24c are formed by bending one pipe member having a circular cross-sectional shape in an approximately U shape as viewed in a side view.

To describe the above-mentioned configuration also with reference to FIG. 1, the rear pole portions 24b are disposed at positions which substantially correspond to the seat back 41 of the seat 40 in an anteroposterior direction. A seatbelt retractor 52 is mounted on the rear pole portion 24b from a rear side.

The first cross member 21 connects front portions of the left and right upper beam portions 24c to each other in a vehicle width direction. The second cross member 22 connects upper portions of the left and right rear pole portions 24b to each other in a vehicle width direction. The third cross member 23 connects middle portions of the left and right rear pole portions 24b in a vertical direction to each other in a vehicle width direction.

The chassis 10 includes: a pair of left and right main frames 11 which extends rearward behind the seat 40; a pair of left and right seat frames 12 which is joined to front lower portions of the main frames 11 and extends frontward; and a ROPS mount 13 which extends between the pair of left and right main frames 11 in a vehicle width direction and is disposed above the left and right main frames 11. The main frames 11 are positioned between the pair of left and right rear wheels 3 (see FIG. 1) in a vehicle width direction. The seat cushion 42 of the seat 40 is supported on upper portions of the seat frames 12.

A seatbelt anchor bracket 26 which extends frontward is mounted on a center portion of the ROPS mount 13 in a vehicle width direction. The seatbelt anchor bracket 26 has: an upper surface portion 26a, and a pair of left and right side surface portions 26b which extends downward from both left and right side portions of the upper surface portion 26a so that the seatbelt anchor bracket 26 is formed into a downwardly-opened U-shaped cross section. To be more specific, the upper surface portion 26a is inclined downward as the upper surface portion 26a extends forward.

A seat striker pin 28 which extends upward (in a vertical direction with respect to the upper surface portion 26a) is mounted on the upper surface portion 26a of the seatbelt anchor bracket 26, and a proximal end portion of the seatbelt buckle 53 is mounted on the pair of left and right side surface portions 26b of the seatbelt anchor bracket 26 such that the proximal end portion of the seatbelt buckle 53 is rotatable in an anteroposterior direction. To describe the configuration also with reference to FIG. 1, the seatbelt buckle 53 is positioned behind the seat cushion 42 and below the seat back 41. To be more specific, the seatbelt buckle 53 is positioned at an area where the seat back 41 and the seat cushion 42 are disposed adjacently to each other.

An air cleaner fixing portion 27 on which an air cleaner (not shown in the drawing) is mounted is integrally formed on a lower portion of the seatbelt anchor bracket 26.

To both side portions of the ROPS mount 13 in a vehicle width direction, lower portions of the pair of left and right rear pole portions 24b of ROPS 20 are detachably connected from the outside in the vehicle width direction by way of a pair of left and right ROPS attachment brackets 25 respectively.

Pivot support portions 12a which support a front portion of the seat cushion 42 in a rotatable manner about an axis extending in the vehicle width direction are formed on front end lower portions of the pair of left and right seat frames 12 respectively.

The seat 40 is a bench seat which is configured to be sit side by side in a lateral direction by a plurality of occupants. In this embodiment, the seat back 41 and the seat cushion 42 are configured so as to form a seat for two occupants where a driver's seat and a passenger's seat are integrally formed with each other. The seat back 41 extends substantially in a vertical direction, and is mounted on a third cross member 23 from a front side.

The seat cushion 42 has a pair of left and right hinge portions 43 on a front lower portion thereof. The respective hinge portions 43 are formed in a frontwardly and upwardly bent shape as viewed in a side view, and front ends of the hinge portions 43 are rotatably supported on the pivot support portions 12a of the pair of left and right seat frames 12 respectively. That is, the seat cushion 42 is configured to be movable between an open position where a rear portion of the seat cushion 42 is lifted by way of the hinge portions 43 as shown in FIG. 3 so as to allow an occupant to access a space disposed below the seat cushion 42 and a normal position where the rear portion of the seat cushion 42 is not lifted and is supported on the seat frames 12 as shown in FIG. 1 (also referred to as a closed position).

FIG. 3 is a perspective view of the chassis 10 as viewed from behind and above, and FIG. 3 also shows the seat 40 where the seat cushion 42 is positioned at the open position. As shown in FIG. 3, the seat fixing device 60 is fixedly mounted on a lower surface of a rear end of the seat cushion 42, and is positioned at a center portion in the vehicle width direction. The seat fixing device 60 includes: a fixing device body part 61 which locks the seat cushion 42 positioned at the closed position to the chassis 10; and a fixing device operating part 62 for releasing locking of the seat cushion 42 by the fixing device body part 61.

A pin engaging hole 61a which engages with the seat striker pin 28 when the seat cushion 42 is positioned at the closed position (FIG. 1) is formed in a lower surface of the fixing device body part 61. In a state where the seat cushion 42 is locked at the closed position, when the fixing device operating part 62 is pulled upward, the seat fixing device 60 releases locking between the seat striker pin 28 and the pin engaging hole 61a in the fixing device body part 61.

Figure 4:
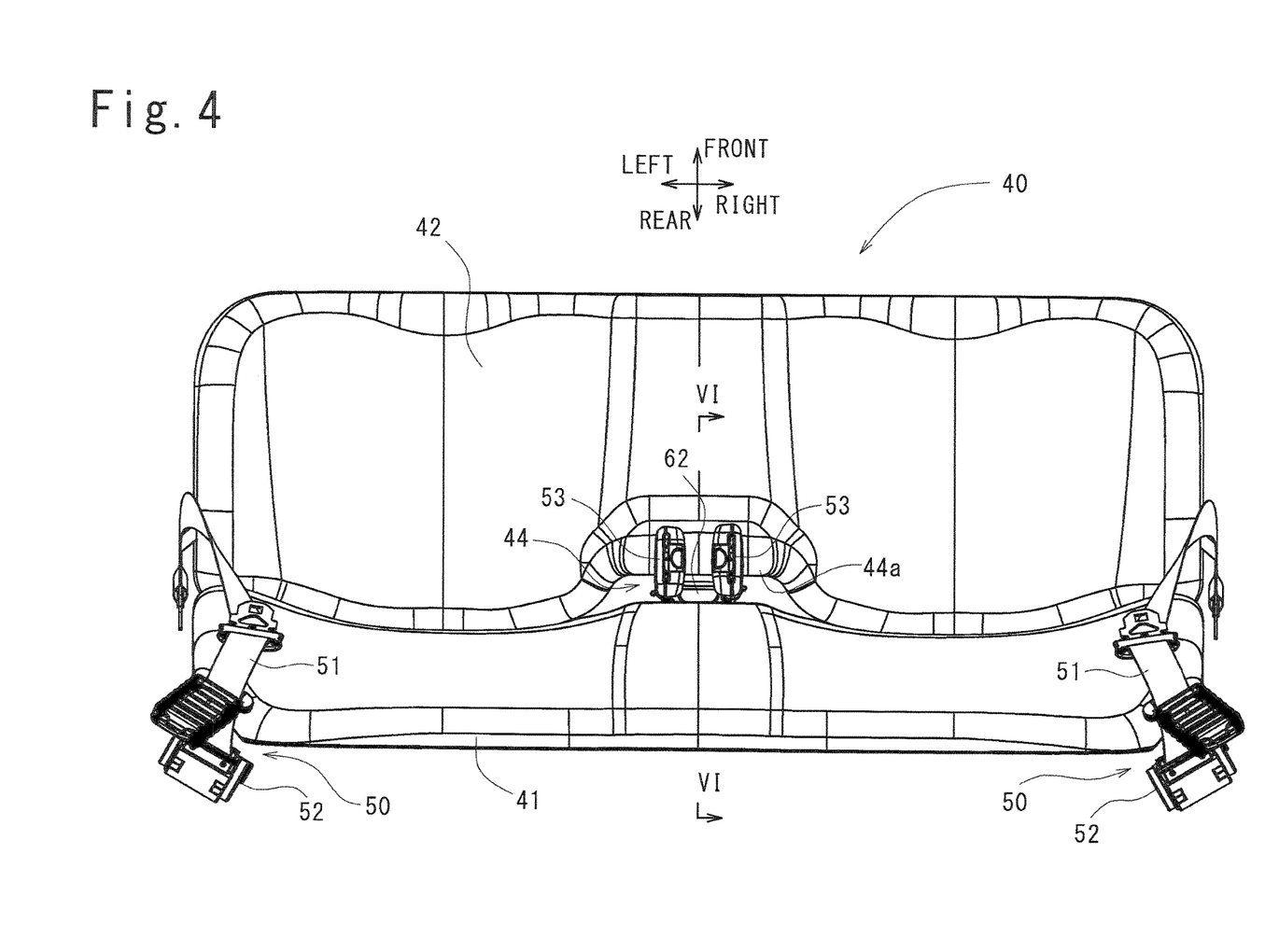
FIG. 4 is a plan view of the bench seat and a seatbelt device.
Figure 5:
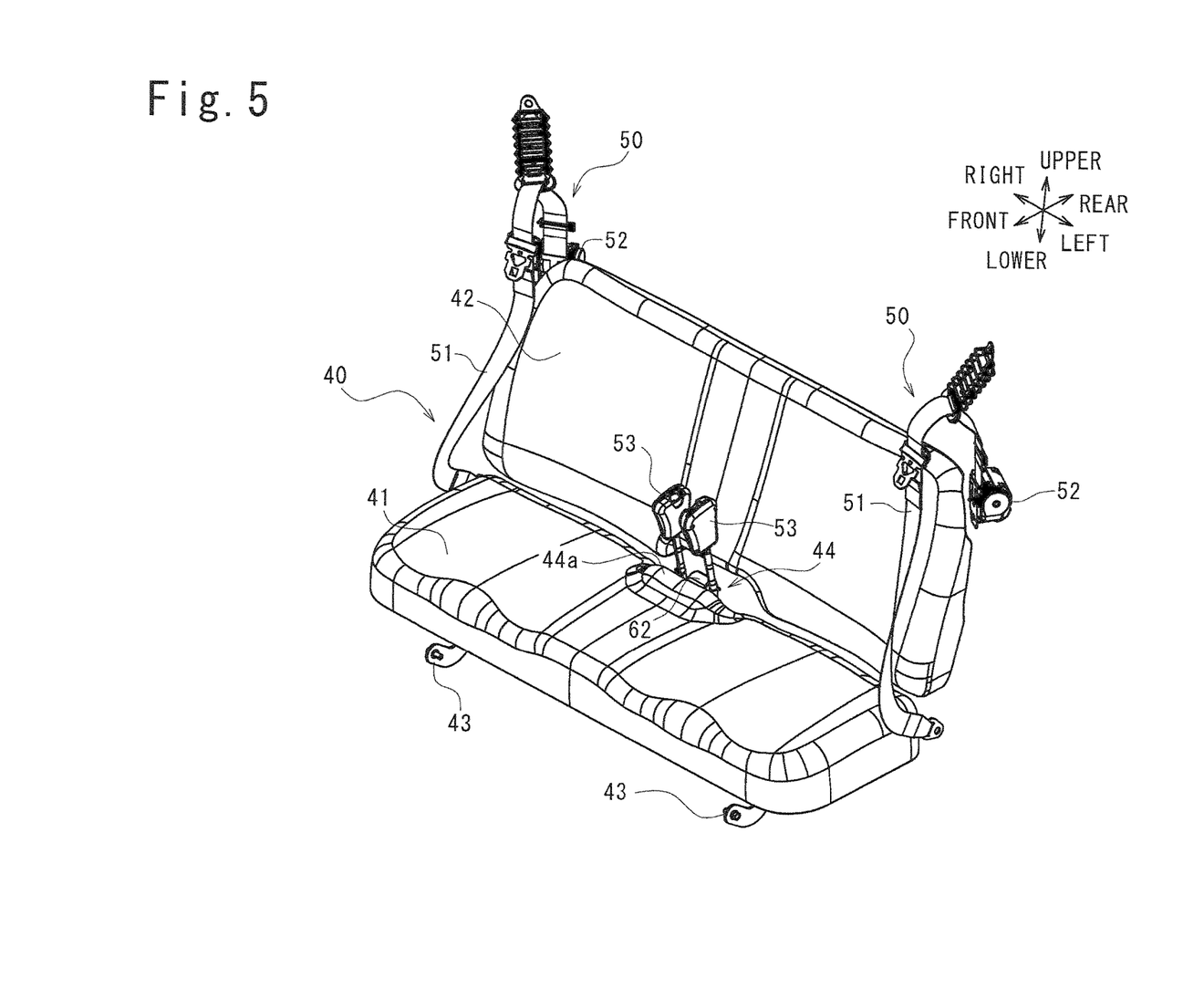
FIG. 5 is a perspective view of the bench seat and the seatbelt device.

FIG. 4 is a plan view showing the seat 40 positioned at the closed position and the seatbelt device 50. FIG. 5 is a perspective view showing the seat 40 positioned at the closed position and the seatbelt device 50. As shown in FIG. 4, the seat cushion 42 has a recessed portion 44 indented toward a front side on a rear edge portion thereof. The recessed portion 44 is positioned at the center in the vehicle width direction, that is, between the driver's seat and the passenger's seat, and the pair of left and right seatbelt buckles 53 for the driver's seat and the passenger's seat is disposed in the inside of the recessed portion 44. Further, the fixing device operating part 62 is disposed between the pair of left and right seatbelt buckles 53.

Figure 6:
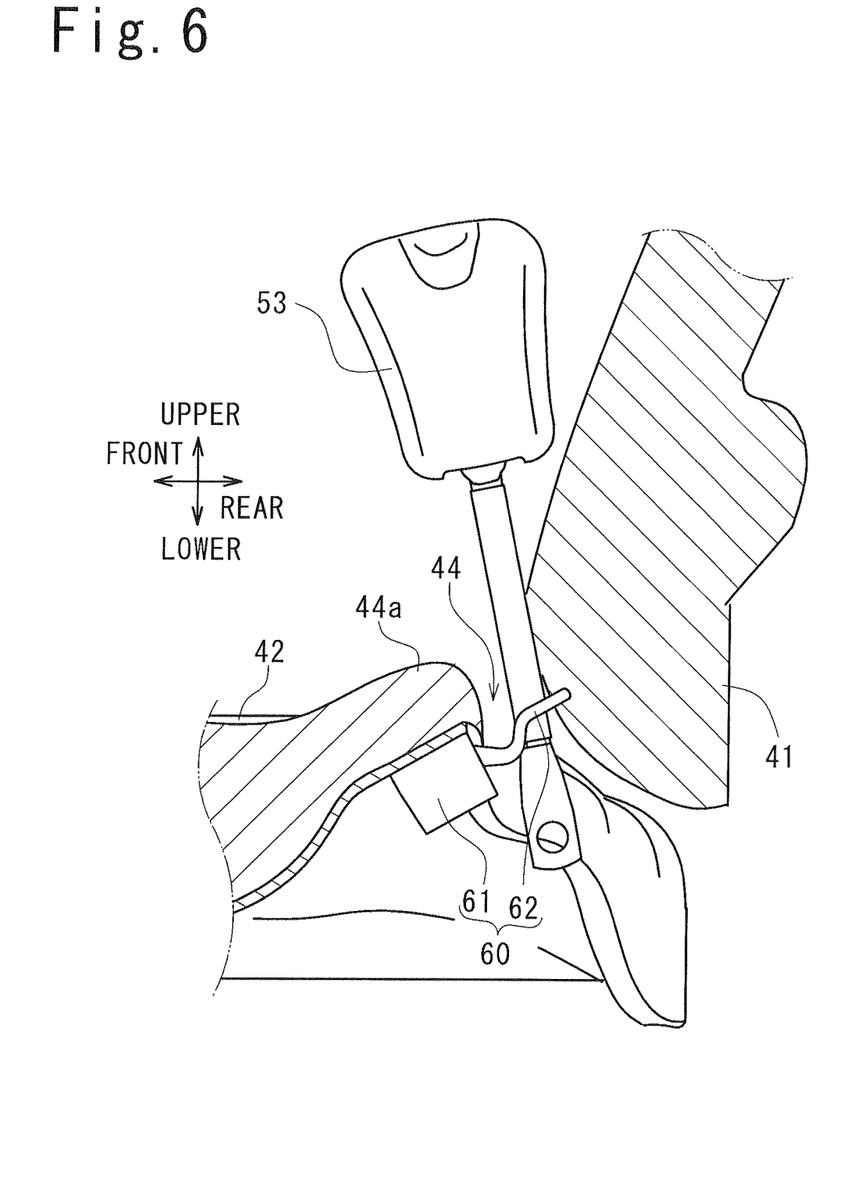
FIG. 6 is a cross-sectional view taken along a line VI-VI in FIG. 4.

As shown in FIG. 5, the recessed portion 44 has a raised portion 44a which is raised upward on a peripheral edge portion of the recessed portion 44. To describe the above-mentioned configuration also with reference to FIG. 3, the fixing device body part 61 is disposed below the raised portion 44a. As shown in FIG. 6 which is a cross-sectional view taken along a line VI-VI in FIG. 4, the seat fixing device 60 is mounted in an upwardly inclined manner toward a rear side. With such a configuration, the fixing device operating part 62 is inclined such that the fixing device operating part 62 is positioned at a higher position toward a rear side. To be more specific, a rear end of the fixing device operating part 62 is positioned at substantially the same height as the raised portion 44a, and is positioned higher than an upper surface (excluding the raised portion 44a) of the seat cushion 42.

As shown in FIG. 1, when the seat cushion 42 is positioned at the closed position, the seat cushion 42 is locked to the chassis 10 (seatbelt anchor bracket 26) by the seat fixing device 60. Accordingly, the seat cushion 42 is strongly fixed to the chassis 10 and hence, flattering of the seat cushion 42 caused when the utility vehicle is traveling on a rough road, for example, can be suppressed.

To describe the above-mentioned configuration also with reference to FIG. 5, when an occupant pulls the fixing device operating part 62 of the seat fixing device 60 upward by inserting his hand to the recessed portion 44 of the seat cushion 42 from such a state, the occupant can release locking of the seat cushion 42 by the fixing device body part 61. As shown in FIG. 3, the occupant pulls the seat cushion 42 upward using the pivot support portions 12a as an origin of rotation thus moving the seat cushion 42 to the open position. When the seat cushion 42 is positioned at the open position, the occupant can access seat lower space E formed below the seat cushion 42 thus enabling maintenance of the engine and accessories not shown in the drawing disposed in the space E, and enabling putting-in and taking-out of luggage to and from the storage space in the space E.

The utility vehicle 1 according to the embodiment described above can acquire the following advantageous effects.

(1) The seat fixing device 60 is disposed between the seatbelt buckle 53 for a driver's seat and the seatbelt buckle 53 for a passenger's seat which are disposed close to each other in the lateral direction. With such an arrangement of the seat fixing device 60, the seat fixing device 60 can be disposed in a compact manner by effectively making use of a dead space formed between the seatbelt buckles 53 disposed adjacently to each other. Accordingly, it is possible to ensure an area where an occupant is seated while enabling an easy access to the seat fixing device 60.

(2) In a plan view shown in FIG. 4, the fixing device operating part 62 of the seat fixing device 60 is disposed in the recessed portion 44 which is positioned on a rear portion of the seat cushion 42 and is indented toward a front side. With such an arrangement of the fixing device operating part 62, there is no possibility that the fixing device operating part 62 of the seat fixing device 60 is interrupted by the seat cushion 42 and hence, the fixing device operating part 62 can be easily visually recognized from above whereby the operability of the fixing device operating part 62 can be enhanced. Further, the fixing device operating part 62 can be easily disposed closer to a front side of the seat cushion 42 while being disposed behind the seat cushion 42 and hence, accessibility to the fixing device operating part 62 from a front side of the seat cushion 42 can be enhanced. Further, by disposing the fixing device operating part 62 in the inside of the recessed portion 44, the occupant can easily find the place where the fixing device operating part 62 is disposed, also by touch without relying on viewing with eyes and hence, accessibility to the fixing device operating part 62 is enhanced.

(3) The seat cushion 42 has the raised portion 44a raised upward on the peripheral portion of the recessed portion 44. As a result, an occupant can easily insert his hand into the space below the raised portion 44a and hence, the occupant can easily grip the seat cushion 42 whereby the occupant can easily move the seat cushion 42 between the open position and the normal position.

(4) The fixing device body part 61 of the seat fixing device 60 is disposed below the raised portion 44a. With such an arrangement of the fixing device body part 61, the seat fixing device 60 can be disposed below the raised portion 44a in an overlapping manner and hence, the seat fixing device 60 can be disposed in a compact manner. Further, by disposing the seat fixing device 60 below the raised portion 44a, the seat fixing device 60 can be easily disposed close to an upper surface of the seat cushion 42 and hence, accessibility to the fixing device operating part 62 is enhanced whereby operability of the seat fixing device 60 can be enhanced. Further, due to the formation of the raised portion 44a, the occupant can easily find the place where the fixing device operating part 62 is disposed, also by touch without relying on viewing with eyes and hence, accessibility to the fixing device operating part 62 is enhanced.

(5) As shown in FIG. 6, the seat fixing device 60 is disposed in an upwardly inclined manner toward a rear side on a lower surface of the rear portion of the seat cushion 42, and the fixing device operating part 62 extends in an upwardly inclined manner toward a rear side. As a result, it is possible to further easily dispose the fixing device operating part 62 of the seat fixing device 60 closer to the upper surface of the rear portion of the seat cushion 42. Accordingly, the accessibility to the fixing device operating part 62 is enhanced and hence, the operability of the seat fixing device 60 can be further enhanced.

In the above-mentioned embodiment, although the description has been made by taking the case where the bench seat is formed of only the front bench seat for two occupants as an example, the present invention is not limited to such a bench seat. That is, the present invention is also suitably applicable to a case where the bench seat is formed of seats in two rows consisting of a front seat and a rear seat or seats in three or more rows and any one of the seats is formed of a bench seat for two occupants or three or more occupants, for example.

In the above-mentioned embodiment, although the description has been made by taking the case where two seatbelt buckles are disposed close to each other in the lateral direction at the center portion in the vehicle width direction as an example, the present invention is not limited to such seatbelt buckles. That is, for example, as in the case where the present invention is applied to a bench seat for three occupants, the present invention is also suitably applicable to a case where two seatbelt buckles which are disposed close to each other in the lateral direction are disposed in an offset manner toward either a left side or a right side.

In the above-mentioned embodiment, although the description has been made by taking the case where the three-point-type seatbelt is used as an example, the present invention is not limited to such a seatbelt. The present invention is also applicable to a two-point-type seatbelt or a four-or-more-point-type seatbelt.

To recapitulate the description made heretofore, it is sufficient to dispose the seat fixing device between two seatbelt buckles disposed close to each other in the lateral direction among a plurality of seatbelt buckles provided corresponding to a plurality of occupants.

Various modifications and variation are conceivable without departing from the gist and scope of the present invention described in claims.

What is claimed is:

1. A bench seat for a utility vehicle, the bench seat comprising:
   a seat cushion configured to be movable between an open position where a rear portion is lifted by way of a hinge portion mounted on a front end and a normal position where the rear portion is not lifted, the seat cushion having a plurality of seating areas;
   a plurality of seatbelt buckles disposed behind the seat cushion, the plurality of seatbelt buckles including at least two seatbelt buckles disposed close to each other in a lateral direction between two adjacent seating areas; and
   a seat fixing device disposed between said two seatbelt buckles disposed close to each other, the seat fixing device being configured to lock the seat cushion positioned at the normal position to a chassis.

2. The bench seat for a utility vehicle according to claim 1, wherein
   the rear portion of the seat cushion positioned at the normal position has a recessed portion indented toward a front side,
   a peripheral edge portion of the recessed portion has a substantial U-shape, wherein a center of the peripheral edge portion is positioned at a front side relative to a rear peripheral portion of the seat cushion outside of the recessed portion, and
   an operating part of the seat fixing device is disposed inside the recessed portion.

3. The bench seat for a utility vehicle according to claim 2, wherein the seat cushion has a raised portion extending upward on a peripheral portion of the recessed portion, and
   the raised portion extends higher than an upper surface of the seat cushion outside of the raised portion.

4. The bench seat for a utility vehicle according to claim 3, wherein a body of the seat fixing device is positioned below the raised portion.

* * * * *